United States Patent [19]

Feldbaumer et al.

[11] 4,198,385
[45] Apr. 15, 1980

[54] REDUCTION OF SODIUM SULFATE TO SODIUM SULFIDE

[75] Inventors: Erich Feldbaumer; Heinz Loquenz; Alfred Sandri, all of Graz, Austria

[73] Assignees: Waagner-Biro Aktiengesellschaft; Chemiefaser Lenzing Aktiengesellschaft, both of Austria

[21] Appl. No.: 830,069

[22] Filed: Sep. 2, 1977

[30] Foreign Application Priority Data

Sep. 7, 1976 [AT] Austria .................................. 6603/76
Sep. 16, 1976 [AT] Austria .................................. 6864/76

[51] Int. Cl.² .......................................... C01B 17/00
[52] U.S. Cl. .............................. 423/566; 423/561 A; 423/DIG. 13
[58] Field of Search ............. 423/561 A, 566, DIG. 3

[56] References Cited

U.S. PATENT DOCUMENTS

| | | | |
|---|---|---|---|
| 1,137,780 | 5/1915 | Moore | 423/DIG. 3 |
| 1,699,808 | 6/1929 | Rinman | 423/DIG. 3 |
| 1,808,773 | 6/1931 | Grondona | 423/DIG. 3 |
| 1,900,320 | 3/1933 | Wagner et al. | 423/DIG. 3 |
| 2,416,462 | 2/1947 | Wilcoxson | 423/561 A |
| 3,073,672 | 1/1953 | Cederquist | 423/561 A |
| 3,129,058 | 4/1964 | White et al. | 423/566 X |
| 3,867,251 | 2/1975 | Holme | 423/DIG. 3 |

Primary Examiner—O. R. Vertiz
Assistant Examiner—Gary P. Straub
Attorney, Agent, or Firm—Steinberg and Blake

[57] ABSTRACT

Methods and apparatus pertaining to reduction of sodium sulfate to sodium sulfide include the feeding of sodium sulfate into a combustion chamber in which the sodium sulfate is exposed to a reducing atmosphere while at the same time being exposed also to a temperature above the melting point of sodium sulfide. Thus, a liquid accumulates at the bottom of the combustion chamber and this liquid will of course contain a considerable amount of sodium sulfide reduced from the sodium sulfate. The exhaust gases of the combustion chamber are utilized in a steam generator the exhaust gases of which may in turn be returned to the combustion chamber where these exhaust gases from the steam generator serve as an inert gas which is directed through the collected liquid to increase the turbulence thereof while at the same time additional reducing agents may be introduced into the liquid, in some cases with additional sodium sulfate, for improving the purity of the collected liquid as well as for decreasing the amount of non-reduced sodium sulfate in the liquid. Secondary air is supplied to the steam generator for burning therein the exhaust gases from the combustion chamber.

9 Claims, 4 Drawing Figures

REDUCTION OF SODIUM SULFATE TO SODIUM SULFIDE

BACKGROUND OF THE INVENTION

The present invention relates to methods and apparatus for use in connection with the reduction of sodium sulfate to sodium sulfide.

In particular, the present invention relates to the use of such methods and apparatus in connection with recovery of sulfuric acid and sodium hydroxide in the manufacture of viscose fibers.

It is already known to heat sodium sulfate up to the region of its softening point by way of a carbon-containing reducing medium, so that sodium sulfide will result while at the same time carbon monoxide is formed. This process in general is carried out in a discontinuous manner and requires not only the separation of sodium sulfate dust but also the milling of sodium sulfate and the homogeneous mixing thereof with the reducing medium. It is also known to bring about the reduction of Glauber's salt while utilizing iron salt catalysts.

One possible important application of the present invention is in the viscose fiber industry where it is required to recover from accumulating waste chemicals fresh chemicals necessary for the processes carried out in the industry. During the manufacture of viscose fibers large amounts of sodium sulfate accumulate, and only a relatively small part of the accumulated sodium sulfate can be sold. At the same time, the manufacturing operation requires purchase of large amounts of sodium hydroxide as well as sulfur. The sodium sulfate which is not sold is delivered with waste water to streams and the like. The part of the sodium sulfate which is sold is used as a filler for washing mediums and also will in a finely divided form be returned with waste water to streams and the like. In order to protect the environment it is of course necessary to limit the use of sodium sulfate and to forbid the introduction thereof into streams or other bodies of water.

SUMMARY OF THE INVENTION

It is accordingly a primary object of the present invention to provide methods and apparatus which will solve the above problems in connection with the accumulation of large amounts of sodium sulfate which are difficult to dispose of without harming the environment.

A further object of the present invention is to provide methods and apparatus according to which it becomes possible to utilize the sodium sulfate in such a way that from this sodium sulfate it is possible to achieve sodium hydroxide as well as sulfur in a desirable form.

The present invention in particular has as one of its main objects the provision of a method and apparatus according to which it is possible effectively to reduce sodium sulfate to sodium sulfide so that from the latter it is possible easily and conveniently to derive sodium hydroxide and/or sulfur.

Thus, it is in general an object of the present invention to reduce pollution of the environment with sodium sulfate while at the same time achieving from the sodium sulfate compounds which can be again utilized in the processes involved in the manufacture of viscose fibers. Thus, the sodium sulfate is reduced to sodium sulfide which then by way of zinc oxide is converted into sodium hydroxide while zinc sulfide can be roasted to convert sulfur to sulfuric acid.

According to the invention sodium sulfate dust, in finely divided form, is introduced into a combustion chamber and is molten at a temperature higher than the melting point of sodium sulfide while in the presence of a reducing atmosphere, particularly in the presence of carbon monoxide, hydrogen, and/or a hydrocarbon, so as to be reduced in this way to sodium sulfide. In particular, the sodium sulfate is blown into a reducing part of a burner flame by way of a carrier gas in which the sodium sulfate is suspended. However the sodium sulfate can also be sprayed in dissolved form into the hot reducing atmosphere. According to a further feature of the invention, the reduction of the sodium sulfate to sodium sulfide is carried out in a melting chamber forming part of a steam generator, the reduction gases which discharge from the melting chamber being introduced into the steam generator where they are ignited, burned, and then cooled. Preferably a stoichiometric combustion takes place in the combustion chamber while for the purpose of providing a reducing atmosphere a gaseous reducing medium, such as, for example, a heated hydrocarbon, especially a carrier for the sodium sulfate, is blown into the combustion chamber. However it is also possible to control the combustion in such a way that preliminarily there will be a reducing atmosphere prevailing in the combustion chamber.

The apparatus of the invention for carrying out the method thereof includes the combustion or melting chamber at the bottom of which the molten sodium sulfide which is formed collects while gases which are still combustible discharge from this combustion chamber and have added thereto a secondary air for burning the waste gases from the combustion chamber, the latter burned gases then being cooled at heat exchangers of a steam generator. In particular, the combustion chamber has an upper top burner where fuel is incompletely burned and the sodium sulfate is delivered to the flame. According to another embodiment the combustion chamber has an upper or cover burner where stoichiometric combustion takes place while in addition there are nozzles through which the sodium sulfate is blown into the combustion chamber either together with a hydrocarbon serving as a carrier gas or in a solution or suspension of the sodium sulfate in a liquid hydrocarbon mixture, the latter being sprayed into the combustion chamber. The nozzles by means of which the carrier for the sodium sulfate is introduced into the combustion chamber are directed toward the flame of the burner. Preferably at a lateral part of the lower region of the combustion chamber there is a discharge opening leading to the heating surfaces of the steam generator installation. The bottom wall of the combustion chamber may, in particular, have nozzles for blowing into the collected molten material an inert gas which in particular can be formed by the waste gases resulting from the firing which takes place in the steam generator.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
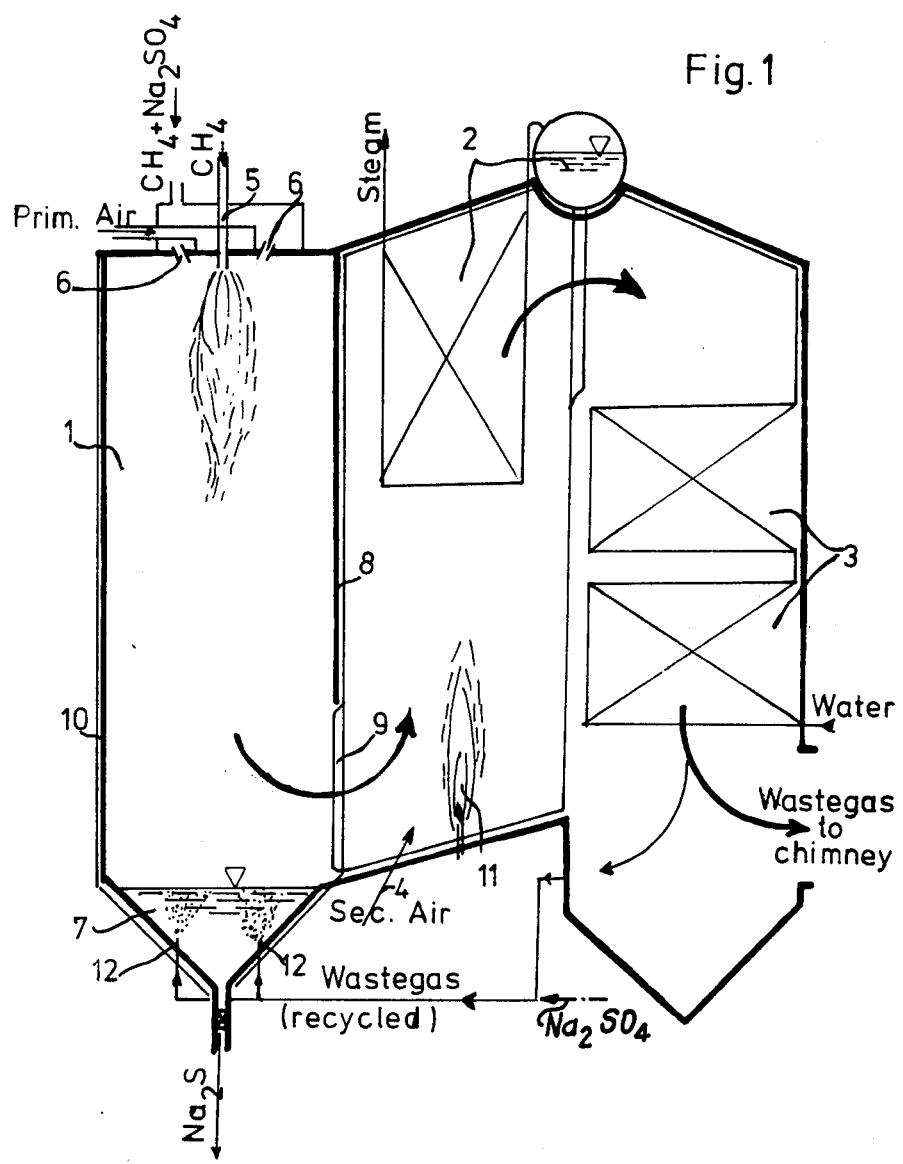
FIG. 1 is a schematic elevation of one possible embodiment of an apparatus of the invention for carrying out the method of the invention.
Figure 2:
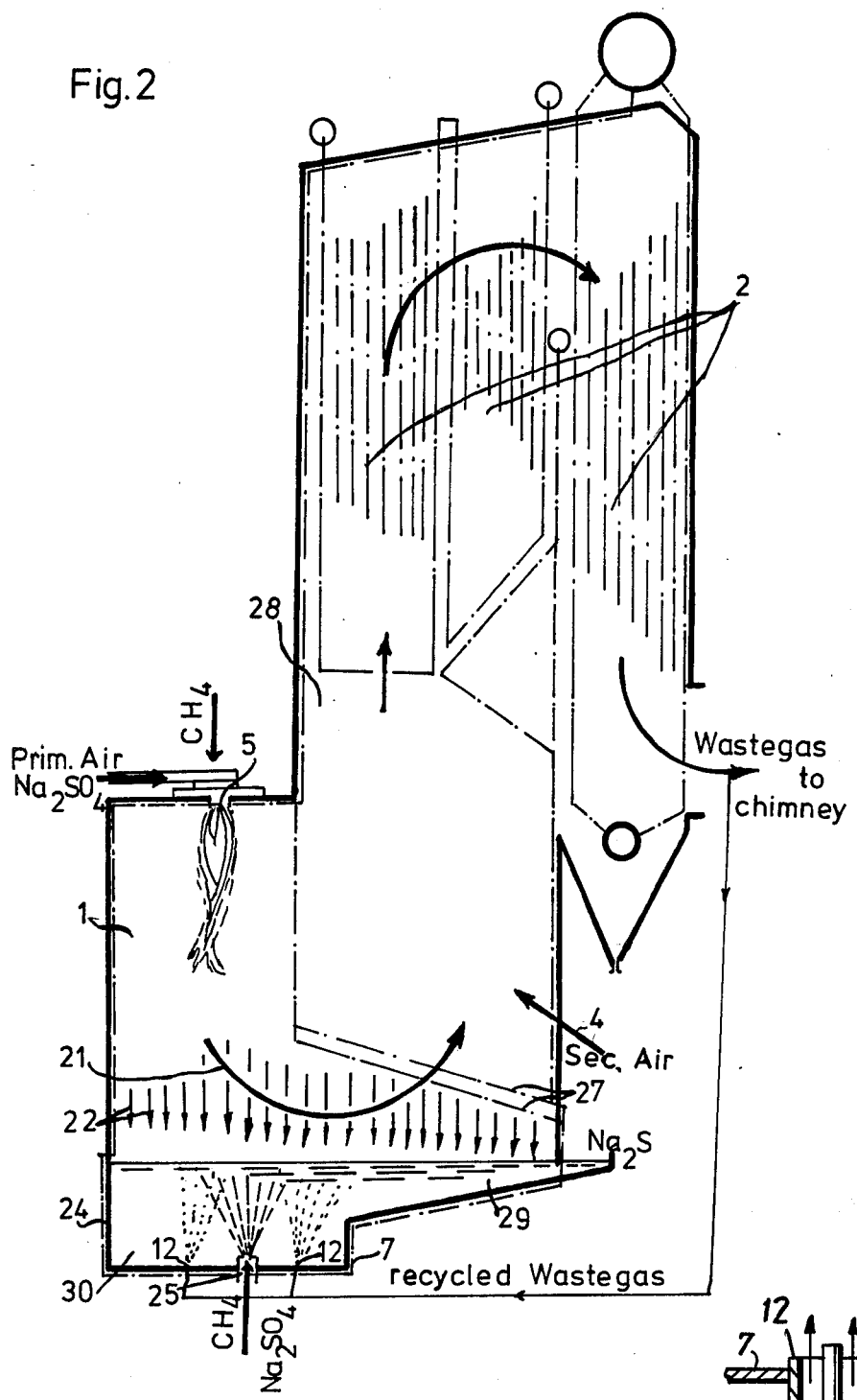
FIG. 2 is a schematic elevation of another embodiment of the apparatus of the invention for carrying out the method thereof.

FIG. 1 schematically illustrates a sulfate reduction installation according to the invention while FIG. 2 shows a further embodiment of the features of FIG. 1. FIG. 1 shows a two-chamber steam boiler in elevation. The first chamber of the steam boiler is the schematically illustrated combustion chamber 1, which serves as a melting chamber which communicates with the steam boiler installation 2. In the combustion chamber 1 the gases which are introduced are only partially burned, while the further burning thereof takes place in the steam boiler installation 2. For this purpose there is a combustion 11 provided for the steam boiler itself. The complete burning of the waste gases from the combustion chamber 1 are carried out at the steam boiler 2 by way of secondary air 4 which is fed into the steam boiler in a manner shown schematically by the arrow 4 in FIG. 1. Thus, the waste gases which are in this way completely burned are cooled at the surfaces of heat exchangers 3 so as to have their temperature in this way reduced to the flue temperature.

The combustion chamber means 1 has an upper cover burner 5 in which a fuel such as methane, for example, is burned either stoichiometrically or incompletely. The combustion air for the top burner 5 is fed with the sodium sulfate which is in a fine granular or dust form. In the combustion chamber 1 the particles of sodium sulfate are melted and converted by the reducing atmosphere into sodium sulfide. The reaction takes place from the outer surfaces of the particles toward the interior thereof, so that the resulting sodium sulfide in liquid form accumulates and is collected at the lower region 7 of the combustion chamber, this region 7 being tapered so as to have the illustrated funnel-shaped configuration. In this way there is provided a discharge material, received from the lower portion 7 of the combustion chamber, this material being capable of simple conversion to sodium hydroxide and sulfuric acid.

The combustion chamber 1 is separated from the boiler 2 by way of a partition 8 which at its lower region adjacent the bottom 7 of the combustion chamber 1 is formed with an opening 9 through which the combustion gases or waste gases of the combustion chamber which are still partially unburned are delivered into the steam boiler where the combustion thereof is completed.

Since the burner 5 normally operates with stoichiometric combustion, and the combustion is possible with a small amount of additional air, and since in the combustion chamber an intense reducing atmosphere at high temperature and a conversion of sodium sulfate into liquid sodium sulfide is required, a nozzle means, in the form of nozzles 6, is provided in the region of the burner 5, the nozzles 6 serving to inject or spray the sodium sulfate together with a hydrocarbon carrier into the combustion chamber, preferably toward the flame. The hydrocarbon carrier can be natural gas or a liquid hydrocarbon, and in this latter event the sodium sulfate is dissolved in the liquid hydrocarbon.

While a part of the reducing component of the atmosphere in the combustion chamber is consumed in connection with the reduction of the sodium sulfate, nevertheless the waste discharge gases which flow out of the combustion chamber 1 are still capable of being burned and are indeed burned in the combustion chamber of the steam generator 2, this latter combustion chamber communicating with the combustion chamber 1. For the purpose of combustion in the steam generator there is an additional firing 11 and a supply of secondary air, although it is also possible to rely only on the supply of secondary air for the combustion in the steam generator. The gases received from the combustion chamber 1 are thus now completely burned and are cooled at the heat-exchanging surfaces of the steam generator, whereupon these gases are blown out into the outer atmosphere after being cleaned. As a result of connecting the steam generator to the combustion chamber 1 it is possible to make the fullest use of the waste heat and the greatest possible recovery of corresponding energy resulting from the sodium sulfate reducing process.

The molten material which collects at the bottom of the combustion chamber 1 contains, besides sodium sulfide, a small amount of sodium sulfate and elemental carbon. In order to achieve the cleanest possible sodium sulfide the collected molten material is thoroughly mixed by blowing into the same an inert gas, for which purpose the schematically illustrated nozzles 12 are utilized. In this way there is an after-reaction of the elemental carbon with the sodium sulfate, thus forming additional sodium sulfide in the molten material. It is also possible to mix additional sodium sulfate with the inert gas, so that the carbon content of the molten material will be reduced. It is preferred to utilize for the inert gas the firing waste gases which result from the combustion in the boiler. The elemental carbon results from the incomplete burning in the combustion chamber 1 which serves as a smelting chamber.

EXAMPLE I

Sodium sulfate is accumulated from the spinning baths of a cellulose-synthetic fiber plant. From the chemical balance of the entire operation, a part of the materials utilized can be returned to the production processes after decomposition of the utilized materials. Thus, sodium sulfate having a granular size of 0.2 mm is blown into the reduction zone of the combustion chamber 1 at a rate of 3 tons per hour and is for the most part reduced to sodium sulfide. The interior of the combustion chamber 1 has a temperature of approximately 1000°–1100° C., while the molten material which accumulates at the lower part of the combustion chamber has a content of approximately 95% sodium sulfide, while the rest of the molten material consists primarily of nonreduced sodium sulfate. In accordance with the reduction reaction

$$Na_2SO_4 + 2\,C = Na_2S + 2\,CO_2$$

sodium sulfide will accumulate at the rate of 1600 kg per hour, this sodium sulfide being contaminated with approximately 80 kg of sodium sulfate. By way of conversion with zinc oxide and leaching, it is possible, while taking into consideration losses, to achieve approximately 1550 kg of sodium hydroxide per hour, of which the non-converted Glauber's salt is taken into consideration as an impurity. The sodium hydroxide is after a corresponding subsequent treatment returned to the spinning baths. The reaction involved is:

$$Na_2S + ZnO + H_2O = 2\ NaOH + ZnS$$

The zinc sulfide which thus accumulates can be converted into zinc oxide by roasting while giving up sulfur dioxide. The released sulfur dioxide can be used to intensify sulfuric acid or to form sulfuric acid.

In the embodiment of FIG. 2 the combined melting and boiler installation 2 is schematically shown in elevation, and in the illustrated installation the combustion chamber 1 also forms the melting chamber while at the region 21 the waste gases from the melting combustion 1 are delivered to the combustion chamber 28 of the boiler itself. In the combustion chamber 28 the unburned part of the gases from the combustion chamber 1 are completely burned, with secondary air 4 being supplied for this purpose as schematically illustrated. The combustion chamber 1 is provided with a top, cover burner 5 in which a fuel, particularly a gas, is burned with tangentially fed combustion air. With this combustion air or the gaseous fuel sodium sulfate dust (Glauber's salt) is fed into the combustion chamber where with considerable generation of heat it is molten and collected at the bottom of the combustion chamber in a suitable trough 24. A part of the Glauber's salt is thus reduced to sodium sulfide in the reducing atmosphere. As soon as the molten material has achieved a predetermined height, nozzles 25 at the bottom 7 of the combustion chamber are opened and through the nozzle means formed by the nozzles 25 a gaseous reducing medium is blown into the collected molten material. As a result the molten sodium sulfate is converted into sodium sulfide. The heat required for this process is achieved from the radiation heat in the combustion chambers 1 and 28, this radiant heat being schematically indicated by the arrows 22. Thus it will be seen that the collected molten material is situated not only beneath the combustion chamber 1 but also beneath the second combustion chamber 28 which forms part of the boiler. At the lowest part 30 of the trough 24 the nozzles 25 are situated while the lateral shallower part 29 of the trough is in the form of a gutter from which the sodium sulfide resulting from reduction of the sodium sulfate is removed. Since this lateral gutter of the trough 24 is shallow, the delivery of heat thereto can be maintained relatively great and the after-reaction, in particular by way of the reducing action of the waste gases of the melting or combustion chamber 1, can be influenced in such a way that even though there is a continuous feeding of sodium sulfate, sodium sulfide of required purity can be derived from the shallow gutter 29.

The melting or combustion chamber 1 is preferably in the form of a cyclone type of combustion chamber where a particularly high combustion temperature and an intimate contact of the liquid sodium sulfate with the reducing medium takes place.

In this way the reduction of the sodium sulfate is increased so that in the collected molten material there is a larger proportion of sodium sulfide.

The reducing waste gases of the combustion chamber 1 are mixed with the carbon carrier which has not been completely consumed for the purposes of reduction, and by way of a tubular grid 27 these gases are introduced into the second combustion chamber 28, the tubular members which form the grid 27 thus serving a function analogous to that of the opening 9 in the embodiment of FIG. 1. In this combustion chamber 28 the combustion of the waste gases is completed and the recovery of the waste heat energy takes place in the boiler installation 2 which receives the heat from the combustion chamber 28.

When a gaseous reduction medium, such as, for example methane ($CH_4$) is utilized, it has proved to be favorable to blow with the gas stream part of the Glauber's salt through the collected molten Glauber's salt, so that the amount of Glauber's salt which is to be reduced is increased in this way. In the drawings the feeding of the individual components to the reduction installation is indicated by way of the labelled arrows, while at the same time the path taken by the gas in the interior of the reduction installation is also indicated by arrows.

In order to avoid plugging of the nozzles, a minimum amount of material is delivered therethrough, so that a quantitative reduction of the material which is fed cannot be carried out. Moreover, the turbulence in the bath of molten material becomes smaller as the amount of gas which is fed is smaller, so that if there is an insufficient feeding of gas and an insufficient turbulence an unfavorable separation of the materials in the molten bath will occur.

During reduction of the molten sodium sulfate by way of a carbon carrier, there are localized areas where the sodium sulfate only becomes converted into sodium sulfide after a relatively long interval. On the other hand, the sodium sulfide releases carbon, as a result of the different affinities of carbon and hydrogen with respect to oxygen, so that a lack of homogeneity is created, thus rendering the carrying out of the process difficult. In order to avoid these unacceptable occurrences, an inert gas is blown into the molten material by way of the nozzles 12 so as to improve the thoroughness of the mixing in the molten material. The waste gas derived from the boiler installation which is connected to the combustion chamber 1 serves as the inert gas, this waste gas having only a small oxygen content, so that reverse oxidation of the sodium sulfide to sodium sulfate is avoided. If, in order to accelerate the reduction reaction an excess of reduction medium is supplied, then the carbon which does not fully react contaminates the molten material. A similar occurrence takes place in the event that the combustion in the melting or combustion chamber 1 is carried out in a less than stoichiometric manner, inasmuch as in this way also there can be formation of soot and contamination of the bath. However if the bath is thoroughly mixed with the inert gas, then the suspended or dissolved carbon can be used as a reduction medium, so that a part of the sodium sulfate in the molten bath is converted into sodium sulfide. In order to complete this reaction, it is, therefore, advantageous to feed together with the inert gas a controlled amount of sodium sulfate dust (Glauber's salt), so as to provide for thorough mixing of the molten material while achieving at the very end of the process a sodium sulfide molten material which is as pure as possible. It is therefore advantageous to discharge the produced sodium sulfide in a discontinuous manner after thorough mixing by way of the inert gas.

Figure 3:
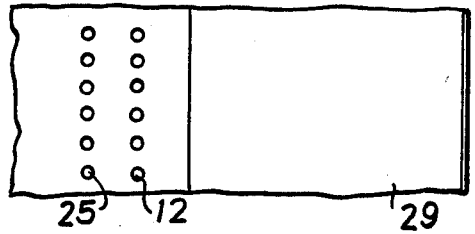
FIG. 3 is a schematic fragmentary plan view illustrating an arrangement of nozzles associated with a trough according to a feature of the invention.

According to an advantageous construction of the vat 24 in which the molten material collects, there is provided, as schematically shown in FIG. 3, between the discharge gutter 29 for the sodium sulfide and the row of nozzles 25 for the reducing medium, a row of nozzles 12 for the inert gas, so that the mixing provided by this particular row of nozzles 12 which is situated between the nozzles 25 and the gutter 29 will assure a thorough mixing of the molten material, these rows of nozzles 12 and 25 of course directing the reducing medium and inert gas through the molten material toward the interior of the combustion chamber.

Figure 4:
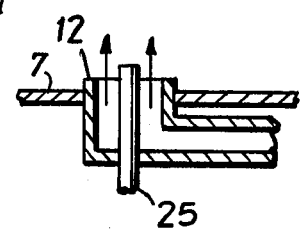
FIG. 4 is a schematic elevation showing a different arrangement of nozzles according to a further feature of the invention.

It is also possible to achieve a similar effect by an arrangement as shown in FIG. 4 in a schematic manner. According to this arrangement the row of nozzles 25 for the reducing medium are respectively surrounded by ring-shaped or annular nozzles 12 for the inert gas. In the event that carbon or coke dust is utilized as the reducing medium, then it is possible to utilize each individual nozzle in such a way that it is alternately connected with the reducing medium and the sodium sulfate so that the reducing medium and sodium sulfate are blown one after the other into the bath.

EXAMPLE II

Approximately three tons of sodium sulfate per hour are accumulated from the spinning baths of a cellulose-synthetic fiber plant, this accumulated sodium sulfate being returned to the production process after it is decomposed. A part of the accumulated sodium sulfate is blown into the melting or combustion chamber 1 of the combined melting and boiler installation, this sodium sulfate which is thus introduced into the chamber 1 having a granular size of 0.2 mm and being delivered into the reducing zone of the combustion chamber so as to be partially reduced to sodium sulfide. The melting or combustion chamber 1 has a temperature of somewhat greater than 1000° C. As a result of the specific size of the combustion chamber the molten material accumulated therein has a content of approximately 50% sodium sulfide, while the remainder of the accumulated molten material consists of non-reduced sodium sulfate. In order to reduce this remaining position of sodium sulfate, a reducing medium, such as, for example, methane or another gaseous hydrocarbon, is blown through the molten material, so that there is created a zone of turbulence in which not only the sodium sulfate which is blown in but also the sodium sulfate which is dissolved in the molten material are for the most part reduced to sodium sulfide. As a result of the additional blowing in of an inert gas, such as, for example, flue gas from the boiler, the turbulence in the bath is increased, so that even though there is a reduction in the volume of the bath, there is nevertheless an improvement in the degree of purity of the molten material up to 97%. Of course it is to be noted that because of the reducing atmosphere at the surface of the bath there is a further reduction of the dissolved sodium sulfate into sodium sulfide according to the reaction $$Na_2SO_4 + 2C = Na_2S + 2 CO_2.$$

In this particular example approximately 1600 kg of sodium sulfide accumulates each hour, this latter amount of sodium sulfide being contaminated with approximately 50 kg of sodium sulfate. By conversion with zinc oxide and leaching, it is possible to achieve each hour approximately 1570 kg of sodium hydroxide. The resulting accumulation of zinc sulfide can by roasting be converted into zinc oxide while releasing sulfur dioxide, and of course this latter free sulfur dioxide can be used to intensify sulfuric acid or also to achieve fresh sulfuric acid.

What is claimed is:

1. A method for substantially completely reducing $Na_2SO_4$ to $Na_2S$, comprising the steps of introducing $Na_2SO_4$ in finely divided form into a primary combustion chamber having a reducing atmosphere maintained at a temperature greater than the melting temperature of $Na_2S$ thereby in a primary reduction step partially converting the $Na_2SO_4$ to $Na_2S$, simultaneously forming a melt of $Na_2SO_4$ and $Na_2S$ at the bottom of said chamber and producing exhaust gases which are still reducing, and directing said reducing exhaust gases out of said combustion chamber, combusting said reducing exhaust gases to form a second gas which is inert with respect to $Na_2SO_4$ and $Na_2S$, cooling the thus obtained inert second gas, passing a portion of said cooled inert second gas through said melt of $Na_2SO_4$ and $Na_2S$ and supplying a reducing agent from a source other than the primary reduction step into the bottom of said melt to agitate said melt and to reduce therein in a secondary reduction step any remaining $Na_2SO_4$ to $Na_2S$.

2. A method as recited in claim 1, wherein said introducing step comprises entraining said $Na_2SO_4$ in a carrier gas and blowing said carrier gas into said primary combustion chamber.

3. A method as recited in claim 1, wherein said introducing step comprises dissolving said $Na_2SO_4$ in a combustible liquid to form a solution and injecting said solution into said primary combustion chamber.

4. A method as recited in claim 1, wherein the reducing agent from a source other than the primary reduction step is admixed with said cooled second gas to form an admixture of said cooled second gas and reducing agent which is passed through said melt.

5. A method as recited in claim 1, wherein the $Na_2SO_4$ present in the melt is reduced by the reducing agent supplied along with the inert second gas which is recirculated into said melt, and heating said melt by radiation from said combustion chamber.

6. A method as recited in claim 1, wherein the inert second gas and a gaseous reducing agent are alternately blown through the melt.

7. A method as recited in claim 1, wherein the reducing agent from a source other than the primary reduction step is a gaseous reducing agent.

8. A method as recited in claim 7, wherein said gaseous reducing agent comprises $CH_4$.

9. A method as recited in claim 7, wherein said gaseous reducing agent has finely divided $Na_2SO_4$ contained therein.

* * * * *